(12) United States Patent
Lipa et al.

(10) Patent No.: US 10,086,874 B2
(45) Date of Patent: Oct. 2, 2018

(54) MODULAR VEHICLE PLATFORM AND RELATED METHODS

(71) Applicant: Ford Global Technologies, LLC, Dearborn, MI (US)

(72) Inventors: Jeffrey Lipa, Canton, MI (US); Steve Scott Allen, Saline, MI (US); Peter Simeon Lazarevski, Dearborn, MI (US); Scott J Bell, Canton, MI (US); Shane Edward Foley, Livonia, MI (US); Stephen Dockstader, South Lyon, MI (US); Joseph Skynar, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/365,542

(22) Filed: Nov. 30, 2016

(65) Prior Publication Data

US 2018/0148095 A1    May 31, 2018

(51) Int. Cl.
  *B62D 21/11*  (2006.01)
  *B60G 7/00*  (2006.01)
  *B60G 15/06*  (2006.01)

(52) U.S. Cl.
  CPC .............. *B62D 21/11* (2013.01); *B60G 7/001* (2013.01); *B60G 7/008* (2013.01); *B60G 15/068* (2013.01); *B60G 2202/31* (2013.01); *B60G 2204/128* (2013.01); *B60G 2204/143* (2013.01); *B60G 2204/148* (2013.01);
  (Continued)

(58) Field of Classification Search
  CPC ...... B62D 21/11; B60G 7/001; B60G 15/068;
  B60G 7/008; B60G 2204/128; B60G 2204/148; B60G 2206/72; B60G 2206/7102; B60G 2202/31; B60G 2204/4302; B60G 2206/604;
  (Continued)

(56) References Cited

U.S. PATENT DOCUMENTS

| 3,583,725 A | 6/1971 | Fry |
| 5,536,035 A | 7/1996 | Bautz et al. |

(Continued)

FOREIGN PATENT DOCUMENTS

| GB | 876280 | 8/1961 |
| GB | 2529175 | 2/2016 |

OTHER PUBLICATIONS

Creason, "Talking 2015 Mustang Suspension With Kenny Brown," StangTV.com, Aug. 13, 2014, last retrieved from http://www.stangtv.com/tech-stories/brakes-suspension/talking-2015-mustang-suspension-kenny-brown/ on Jun. 26, 2016, (7 pages).

*Primary Examiner* — Drew J Brown
(74) *Attorney, Agent, or Firm* — Frank MacKenzie; Hanley, Flight & Zimmerman, LLC

(57) ABSTRACT

Modular vehicle platforms are disclosed. An example modular platform includes a frame to couple to a body of a vehicle. A first bracket is coupled to the frame. One of a second bracket or a third bracket is coupled to the frame. The first bracket is spaced from the second bracket or the third bracket. The first bracket and the second bracket enable attachment of a first suspension to the frame. The first bracket and the third bracket enable attachment of a second suspension to the frame. The first suspension has a first geometry that is different than a second geometry of the second suspension.

23 Claims, 13 Drawing Sheets

(52) U.S. Cl.
CPC ........... *B60G 2204/4302* (2013.01); *B60G 2206/0114* (2013.01); *B60G 2206/604* (2013.01); *B60G 2206/7102* (2013.01); *B60G 2206/72* (2013.01); *B60Y 2304/05* (2013.01)

(58) Field of Classification Search
CPC ...... B60G 2206/0114; B60G 2204/143; B60Y 2304/05
See application file for complete search history.

(56) References Cited

U.S. PATENT DOCUMENTS

| | | | |
|---|---|---|---|
| 5,967,536 A | 10/1999 | Spivey et al. | |
| 6,457,728 B1* | 10/2002 | Klais ................. | B60G 7/02 280/86.75 |
| 6,481,079 B1* | 11/2002 | Newhan ............. | B60G 3/20 280/86.75 |
| 2014/0375006 A1* | 12/2014 | Jenkins ............. | B60G 3/20 280/86.757 |

* cited by examiner

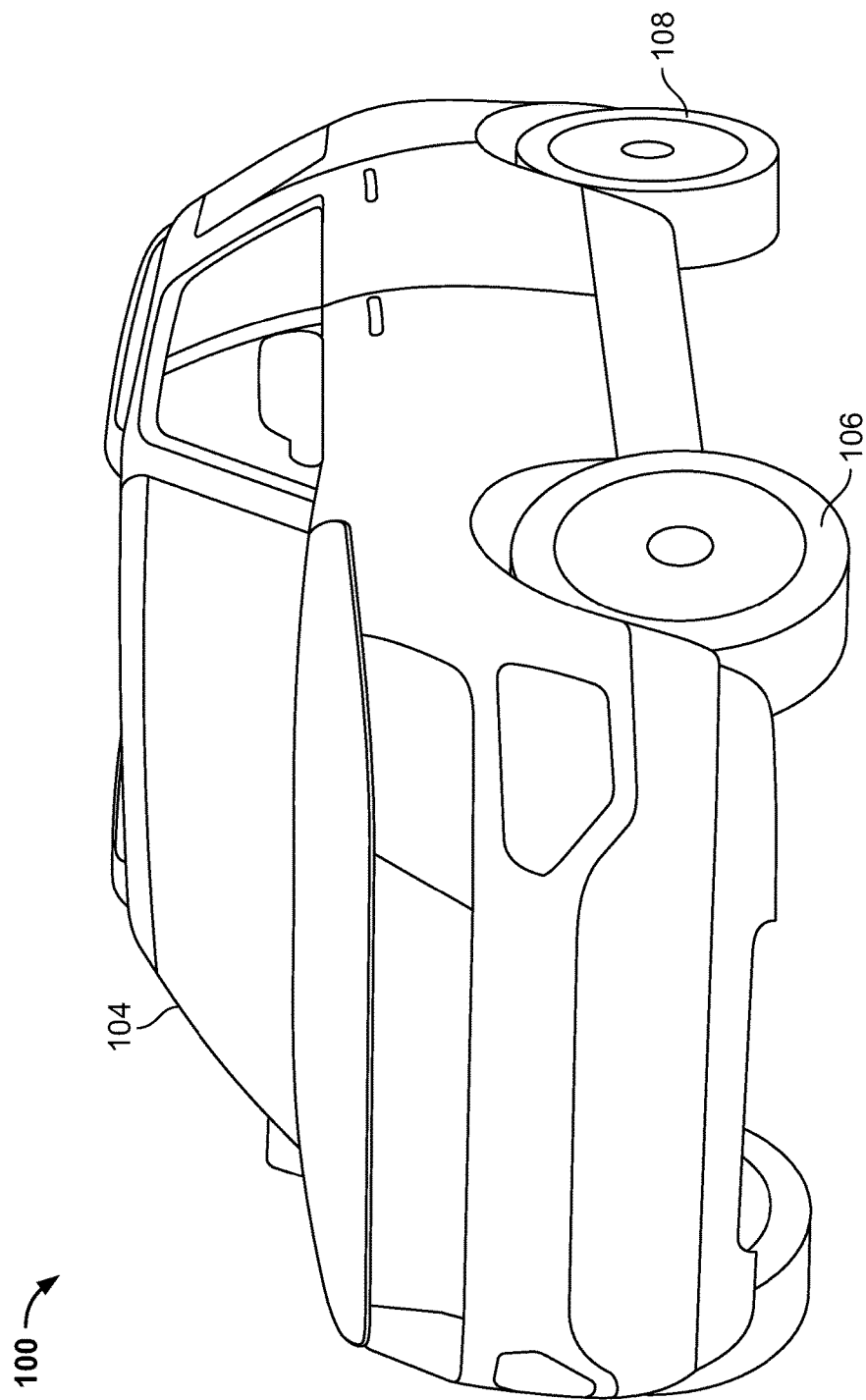

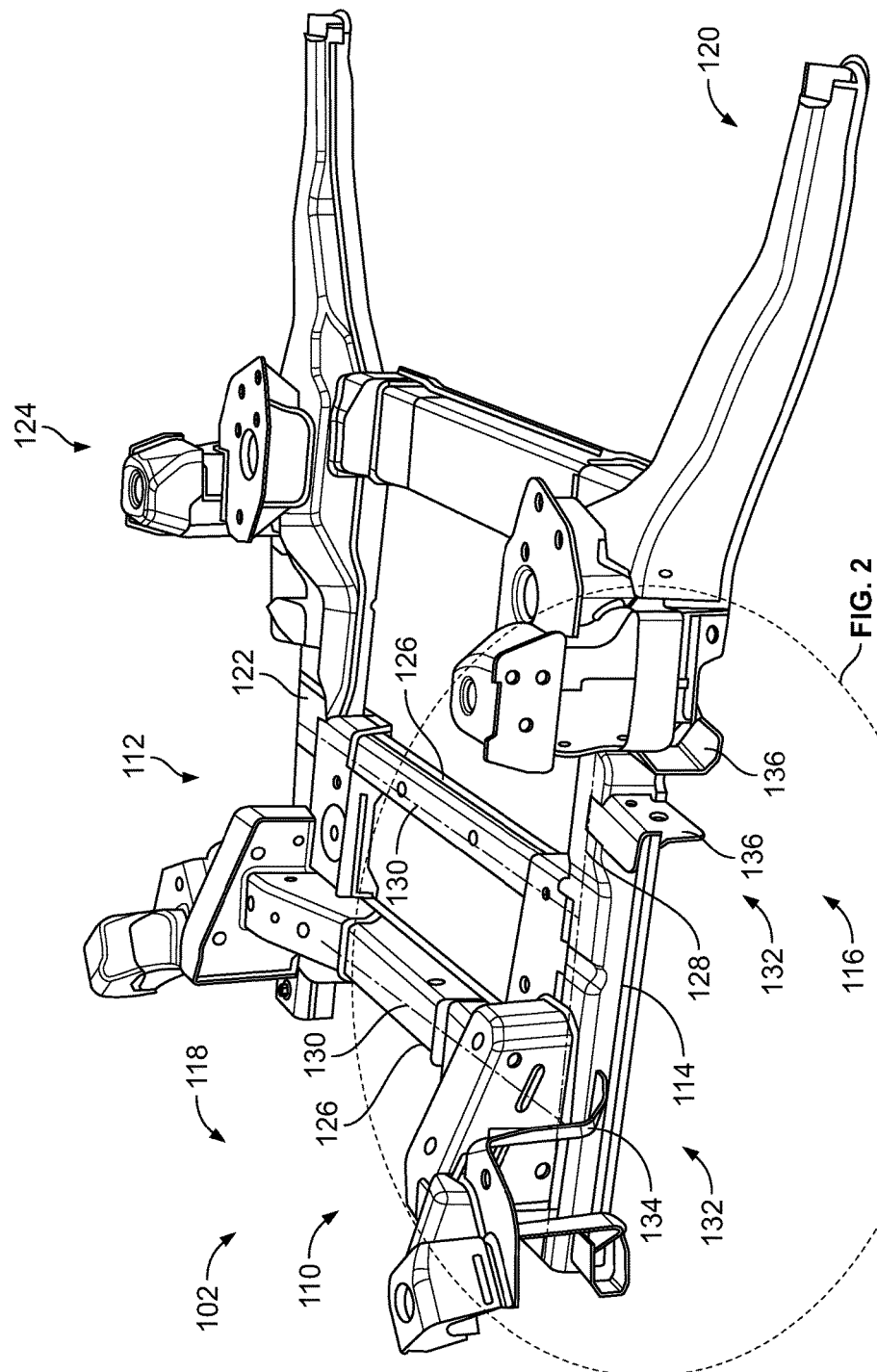

MODULAR VEHICLE PLATFORM AND RELATED METHODS

FIELD OF THE DISCLOSURE

This disclosure relates generally to vehicle frames and, more particularly, to modular vehicle platforms and related methods.

BACKGROUND

To improve vehicle handling and ride characteristics (e.g., steering feel, agility, stability, etc.), vehicles employ suspension systems for absorbing road shock and/or other vibrations. Vehicles such as cars, trucks and other wheeled vehicles employ different suspension architectures to reduce vehicle costs and/or improve handling.

SUMMARY

An example apparatus includes a first bracket that is coupled to the frame. The example apparatus includes one of a second bracket or a third bracket that is coupled to the frame. The first bracket is spaced from the second bracket or the third bracket. The first bracket and the second bracket enable attachment of a first suspension to the frame, and the first bracket and the third bracket enable attachment of a second suspension to the frame. The first suspension has a first geometry that is different than the second geometry of the second suspension.

An example apparatus includes attaching a first bracket to the frame; selecting a first suspension or a second suspension different than the first suspension; obtaining a second bracket if the first suspension is selected or a third bracket if the second suspension is selected; and attaching the second bracket to the frame when the first suspension is selected or attaching the third bracket to the frame when the second suspension is selected, the first bracket and the second bracket to couple the first suspension to the frame, and the first bracket and the third bracket to couple the second suspension to the frame.

An example apparatus includes a frame including a lateral frame connecting a first longitudinal rail and a second longitudinal rail spaced from the first longitudinal rail. A first set of brackets couples to the first longitudinal rail, where the first set of brackets couples lower suspension links of a first suspension to the frame; or a second set of brackets couples to the first longitudinal rail, where the second set of brackets couples lower suspension links of a second suspension to the frame. The first suspension has dimensions that are different than dimensions of the second suspension.

BRIEF DESCRIPTION OF THE DRAWINGS

FIG. 1A illustrates an example vehicle in which the teachings of this disclosure may be implemented.

FIG. 1B illustrates an example modular platform constructed in accordance with the teachings of this disclosure that may be used to implement the example vehicle of FIG. 1A.

Figure 2:
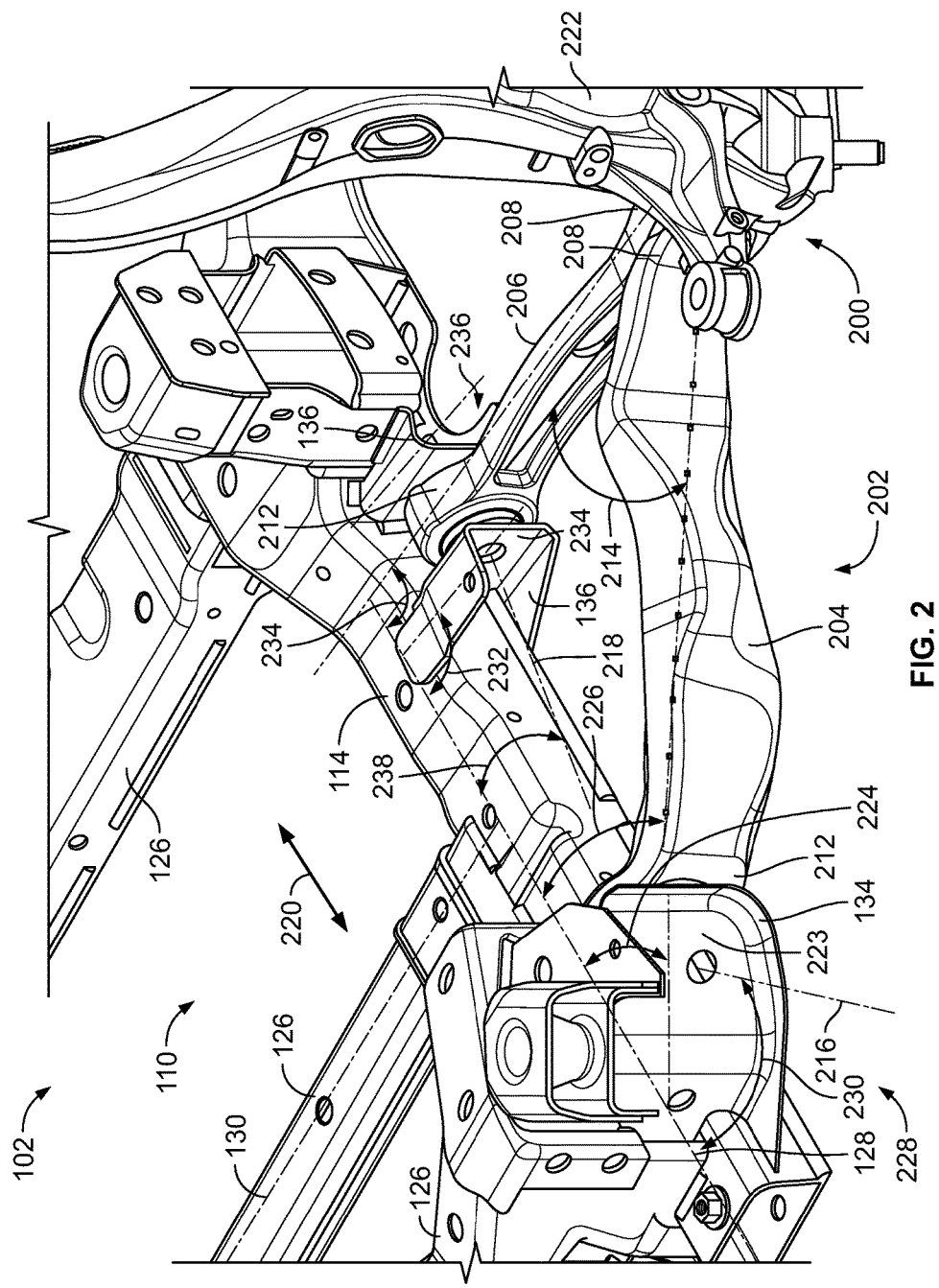
FIG. 2 is a perspective view of a portion of the example modular platform of FIG. 1B to support a first suspension.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

DETAILED DESCRIPTION

Example methods and apparatus disclosed herein provide a modular vehicle frame or subframe that may be employed with a unibody vehicle platform. In some examples, the modular vehicle frame disclosed herein may be employed with body-on-frame platform. Example modular vehicle frames disclosed herein support a first suspension architecture or a second suspension architecture. For example, the modular frame may include a common frame or subframe (e.g., a common lateral frame rail (e.g., lateral frame rail geometry) and/or a common longitudinal frame rail (e.g., longitudinal frame rail geometry)) when a first suspension architecture is coupled to the frame or a second suspension architecture is coupled to the frame. Thus, example modular frames disclosed herein provide a common frame that can receive a first suspension architecture or a second suspension architecture having geometries and dimensions requiring different attachment locations.

In some examples, the first suspension may be a short-long arm (SLA) suspension and the second suspension may be a McPherson strut. A McPherson strut, for example, requires first attachment points to the vehicle frame and the SLA suspension requires second attachment points to the vehicle frame, at least one of the first point of attachment points being different than at least one of the second attachment points. Thus, an example modular frame disclosed herein enables a first suspension architecture to be provided with a first vehicle (e.g., as a standard package) and a second suspension architecture to be provided with a second vehicle (e.g., as a premium package), while reducing manufacturing costs by providing a common frame between first vehicle and the second vehicle. For example, one or more rails of the modular platform or frame (e.g., a longitudinal rail) requires dedicated tooling. A first frame or platform having a first set of rails to accommodate a first suspension and a second frame or platform having a second set of rails to accommodate a second suspension increases manufacturing costs (e.g., tooling costs) significantly. For example, first tooling may form the first set of rails to receive or support the first suspension and second tooling may form the second set of rails to receive or support the first suspension. Requiring different tooling to form different rails that support different suspension architectures for a particular vehicle model (e.g., Ford Explorer®) would increase manufacturing costs significantly.

The example modular platform disclosed herein employs a frame having one set of rails (e.g., longitudinal rails and lateral rails) that can accommodate a first suspension or, alternatively, a second suspension different than the first suspension. An example frame disclosed herein may include longitudinal rails (e.g., side beams) and a lateral rail (e.g., a cross-rail or cross-beam) interconnecting the longitudinal rails. To enable the modular frame to receive the first suspension architecture or the second suspension architecture, the example methods and apparatus disclosed herein employ mounting brackets. Example mounting brackets disclosed herein are coupled (e.g., welded) to the frame to provide attachment points for the first suspension or the second suspension. In some examples, the mounting brackets include a first bracket (e.g., a ride link bracket) and a second bracket (e.g., a lateral link attachment bracket). The first bracket and the second bracket may couple to a longitudinal rail of the frame. In some examples, the first bracket may be at least partially coupled or connected (e.g., either directly or indirectly) to a longitudinal rail and/or a lateral rail of the frame.

In some examples, the first bracket and the second bracket are common brackets that may receive or support the first suspension or the second suspension. The term "common bracket" as used herein is a bracket that can support any of multiple different suspensions such as, for example, a first suspension (e.g., an SLA suspension) or a second suspension (e.g., a MacPherson suspension). For example, a dimensional profile (e.g., a perimeter or shape) of a common bracket is the same when used to support a first suspension or a second suspension. However, in some examples, an aperture of the common bracket may be in a different location between a common bracket employed to support the first suspension or a common bracket employed to support the second suspension. Thus, in some such examples, the first bracket and the second bracket may be common brackets configured to attach, couple or support the first suspension or the second suspension to the modular frame.

In some examples, one of the first bracket or the second bracket is a common bracket and the other one of the first bracket or the second bracket is a unique bracket. As used herein, the term "unique bracket" means a bracket that is configured to support only one type of suspension such as, for example, a first suspension (e.g., a SLA suspension) or a second suspension (e.g., a MacPherson suspension). For example, a dimensional profile (e.g., a perimeter shape) of a first unique bracket may be different than a dimensional profile of a second unique bracket. For example, the first bracket may be a common bracket that can support the first suspension and the second suspension, and the second bracket may include a first unique bracket to support the first suspension or a second unique bracket to support the second suspension. Thus, in some examples, the first unique bracket only supports the first suspension and the second unique bracket only supports the second suspension. For example, the first unique bracket may have a first dimensional profile to accommodate or support the first suspension and the second unique bracket may have a second dimensional profile that is different than the first dimensional profile to accommodate or support the second suspension. In some such examples, the first unique bracket may be employed to couple the first suspension to the frame and the second unique bracket may be employed to couple the second suspension to the frame. For example, a common ride link bracket and a first lateral link bracket (e.g., first unique bracket) may couple a first suspension to the frame, or the first common ride link bracket and a second lateral link bracket (e.g., a second unique bracket) may couple a second suspension to the frame.

In some examples, the first bracket includes a first unique bracket (e.g., a first unique ride link bracket) and a second unique bracket (e.g., a second unique ride link bracket) and the second bracket includes a first unique bracket (e.g., a first unique lateral link bracket) and a second unique bracket (e.g., a second unique lateral link bracket). In some such examples the first unique brackets may be employed to couple the first suspension to the frame, and the second unique brackets may be employed to couple the second suspension to the frame.

FIG. 1A is an example vehicle 100 in which the teachings of this disclosure may be implemented. FIG. 1B is a perspective view of an example modular platform 102 constructed in accordance with the teachings of this disclosure that may be used with the vehicle 100 of FIG. 1A. Referring to FIGS. 1A and 1B, the vehicle 100 of the illustrated example employs the modular platform 102 (FIG. 1B) to support a body 104 of the vehicle 100. The modular platform 102 of the vehicle 100 may be configured to support a first suspension 200 (e.g., as shown for example in FIG. 2) or a second suspension 600 (e.g., as shown for example in FIG. 6) different than the first suspension 200. For example, the first suspension 200 or the second suspension 600 may support a front wheel 106 (e.g., that is coupled to a front axle assembly) of the vehicle 100. In some examples, the first suspension 200 or the second suspension 600 disclosed herein may support a rear wheel 108 (e.g., may be coupled to a rear axle assembly) of the vehicle 100. As disclosed below, the modular platform 102 of the illustrated example provides a flexible platform that enables a manufacturer to deliver different suspension systems or architectures. In some such examples, the vehicle 100 of the illustrated example can be tailored to include a first suspension (e.g., an SLA suspension) to provide a premium package or a second suspension (e.g., a MacPherson strut) to provide a non-premium package.

The vehicle 100 of the illustrated example is a sport utility truck (e.g., a pick-up truck). However, the examples disclosed herein may be implemented with other types of vehicles such as, for example, sedans, sport vehicles, recreational vehicles, and/or any other type of vehicle(s). In some examples, the modular platform 102 of the illustrated example may support a first vehicle (e.g., the vehicle 100 having a first body) or a second vehicle (e.g., having a second body) different than the vehicle 100. Thus, the modular platform 102 of the illustrated example can support two different types of vehicles. For example, the first vehicle having a first body type (e.g., style) may be supported by the modular platform 102 and implemented with a first suspension (e.g., the SLS suspension) and the second vehicle having a second body type different than the first body type (e.g., style) may be supported by the modular platform 102 and implemented with a second suspension (e.g., the McPherson strut).

Referring to FIG. 1B, the modular platform 102 is a frame 110 of the vehicle 100. For example, the frame 110 of the illustrated example includes a subframe of a front suspension assembly 112 of the vehicle 100 that can support, for example, the front wheel 106 of the vehicle 100. The frame 110 of the illustrated example includes a longitudinal rail 114 extending along a driver or left side 116 of the vehicle 100 between a front end 118 of the vehicle 100 and a rear end 120 of the vehicle 100 and a longitudinal rail 122 extending along a passenger or right side 124 of the vehicle 100 between the front end 118 and the rear end 120 of the vehicle 100. The frame 110 of the illustrated example includes lateral rails 126 (e.g., lateral frame cross members) extending between the longitudinal rails 114 and 122. For example, a longitudinal axis 128 of the longitudinal rail 114 is non-parallel (e.g., perpendicular) relative to the longitudinal axes 130 of the lateral rails 126. To support the first suspension 200 (of FIG. 2) to the frame 110, the frame 110 of the illustrated example includes a first set of brackets 132. The first set of brackets 132 of the illustrated example includes a first bracket 134 (e.g., a ride link attachment bracket) and a second bracket 136 (e.g., a lateral link attachment bracket) spaced from the first bracket 134.

FIG. 2 illustrates a perspective, partial view of the modular platform 102 of the vehicle 100 configured to receive the first suspension 200. The first suspension 200 of the illustrated example is a short-long arm suspension or double wish-bone suspension. The first suspension 200 of the illustrated example includes lower suspension links 202 that couples to the frame 110. The lower suspension links 202 includes a first control arm 204 and a second control arm 206. The first control arm 204 and the second control arm 206 have respective first ends 208 that couple (e.g., converge) to a knuckle 222 and second ends 212 that couple to the frame 110. The knuckle 222 supports the front wheel 106 (FIG. 1) of the vehicle 100. To provide target handling characteristic(s) of the first suspension 200, the first control arm 204 of the illustrated example is positioned at an angle 214 (e.g., an angle between approximately 20 degrees and 80 degrees) relative to the second control arm 206.

To configure the modular platform 102 of the illustrated example to receive the first suspension 200, the frame 110 of the illustrated example includes the first bracket 134 (e.g., a ride link bracket) and a second bracket 136 (e.g., a lateral link bracket). The first control arm 204 of the first suspension 200 of the illustrated example is coupled to the frame 110 via the first bracket 134 and the second control arm 206 is coupled to the frame 110 via the second bracket 136. For example, the first control arm 204 is coupled (e.g., fastened) to the first bracket 134 via a first fastener and the second control arm 206 is coupled (e.g., fastened) to the second bracket 136 via a second fastener. To enable the lower suspension links 202 to pivot relative to the frame 110, the second ends 212 of the respective first control arm 204 and the second control arm 206 of the illustrated example include bushings. For example, the first control arm 204 pivots (e.g., rotates) relative to the frame and/or the first bracket 134 about a first pivot axis 216 and the second control arm 206 pivots (e.g., rotates) relative to the frame 110 and/or the second bracket 136 via a second pivot axis 218. Thus, the first control arm 204 is pivotally coupled to the frame 110 via the first bracket 134 and the second control arm 206 of the illustrated example is pivotally coupled to the frame 110 via the second bracket 136.

The first bracket 134 and the second bracket 136 of the illustrated example are positioned on the frame 110 to enable the first suspension 200 to achieve target handling characteristic(s). For example, the first bracket 134 of the illustrated example is spaced from the second bracket 136 in an aft-fore direction 220 (e.g., relative to the orientation of the front end and the rear end of the vehicle 100) along the longitudinal axis 128 of the longitudinal rail 114 based on the angle 214 between the first control arm 204 and the second control arm 206. Thus, a distance (e.g., a direction along the longitudinal axis 128 of the longitudinal rail 114) between the second ends 212 of the respective first control arm 204 and the second control arm 206 of the first suspension 200 determines the positions of the first bracket 134 and the second bracket 136 on the longitudinal rail 114.

Additionally, to enable the first suspension 200 to achieve target handling characteristic(s), the first bracket 134 and the second bracket 136 of the illustrated example are angled relative to the longitudinal axis 128 of the longitudinal rail 114. To enable such an angular relationship between the first bracket 134 and the first control arm 204, the first bracket 134 of the illustrated example is positioned or coupled to the frame 110 such that a main body 223 of the first bracket 134 projects at an angle 224 relative to the longitudinal axis 128 of the longitudinal rail 114. For example, the angle 224 of the first bracket 134 of the illustrated example is substantially similar (e.g., within 2 degrees or identical) to an angle 226 (e.g., of a longitudinal axis of) the first control arm 204 relative to the longitudinal rail 114. Additionally, the first bracket 134 receives the second end 212 of the first control arm 204 to define a connection point 228 between the first bracket 134 and the second end 212 of the first control arm 204. The connection point 228 of the illustrated example provides the first pivot axis 216 positioned at an angle 230 (e.g., between approximately 30 degrees and 80 degrees) relative to the longitudinal axis 128 of the longitudinal rail 114.

To enable an angular relationship between the second bracket 136 and the second control arm 206, the second bracket 136 of the illustrated example is positioned or coupled to the frame 110 such that the second bracket 136 projects at an angle 232 relative to the longitudinal axis 128 of the longitudinal rail 114. For example, the angle 232 of the second bracket 136 of the illustrated example is substantially similar (e.g., within 2 degrees or identical) to an angle 234 (e.g., of a longitudinal axis) of the second control arm 206 relative to the longitudinal rail 114. Additionally, the second bracket 136 receives the second end 212 of the second control arm 206 to define a connection point 236 between the second bracket 136 and the second control arm 206. The connection point 236 of the illustrated example provides the second pivot axis 218 positioned at an angle 238 (e.g., 30 degrees and 80 degrees) relative to the longitudinal axis 128 of the longitudinal rail 114.

Figure 3:
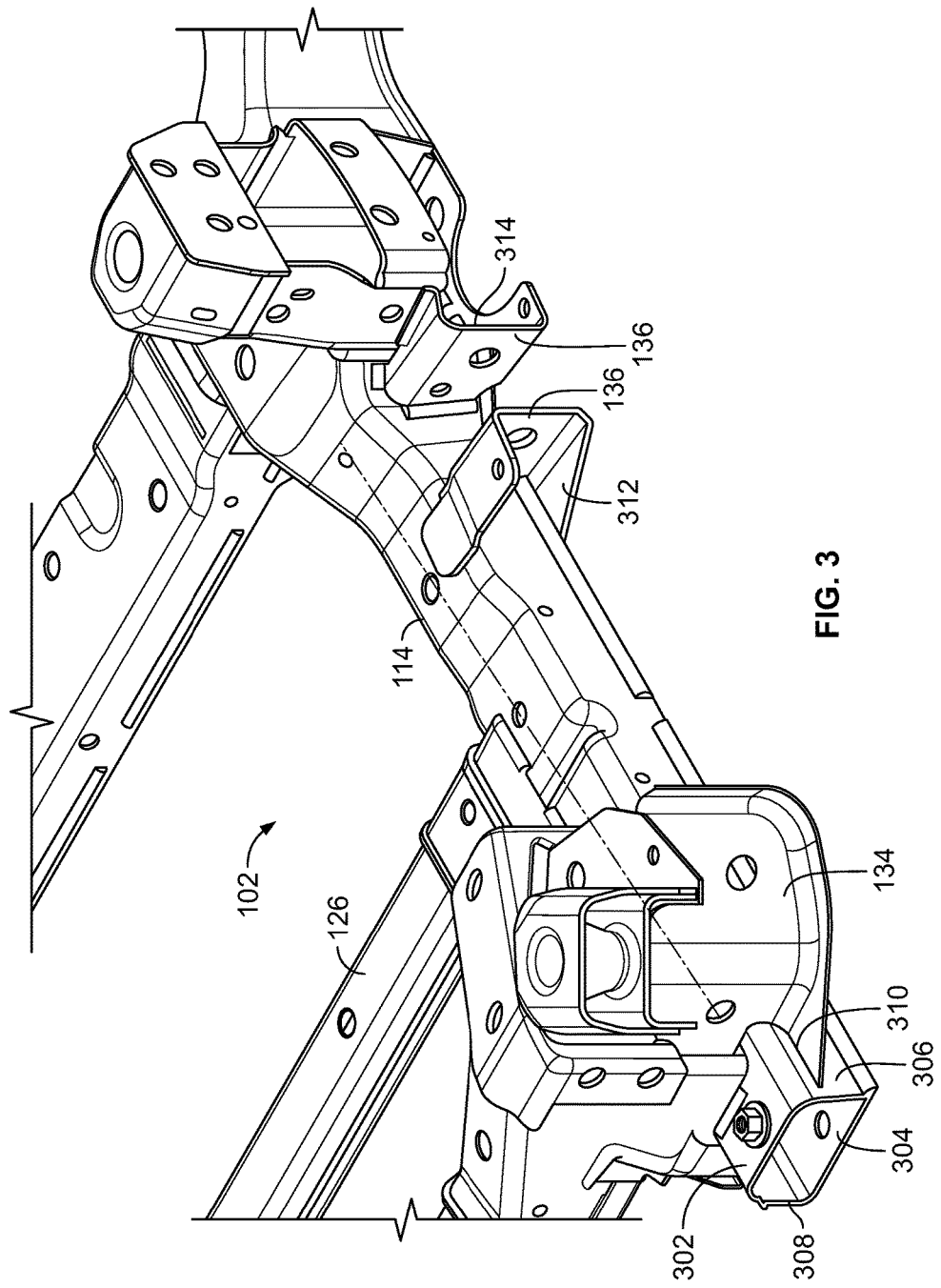
FIG. 3 is a perspective view of the example modular platform of FIG. 2 without the first suspension.

FIG. 3 illustrates the modular platform 102 of FIG. 3 shown without the first suspension 200. Referring to FIG. 3, the longitudinal rail 114 of the illustrated example includes an upper surface 302, a lower surface 304 opposite the upper surface 302. The longitudinal rail 114 of the illustrated example includes an outer side surface 306 and an inner side surface 308 positioned between the upper surface 302 and the lower surface 304. The first bracket 134 and the second bracket 136 of the illustrated example are welded to the longitudinal rail 114 of the modular platform 102. More specifically, a first surface or edge 310 of the first bracket 134 is welded to the outer side surface 306 of the longitudinal rail 114. The second bracket 136 of the illustrated example includes a first body 312 and a second body 314. In the illustrated example, the first body 312 of the second bracket 136 is welded to the upper surface 302, the lower surface 304 and the outer side surface 306 of the longitudinal rail 114. The second body 314 is welded to the outer side surface 306 of the longitudinal rail 114. The first bracket 134 and the second bracket 136 protrude in a direction away from the outer side surface 306 of the longitudinal rail 114 when the first bracket 134 and the second bracket 136 are coupled to the frame 110.

Figure 4:
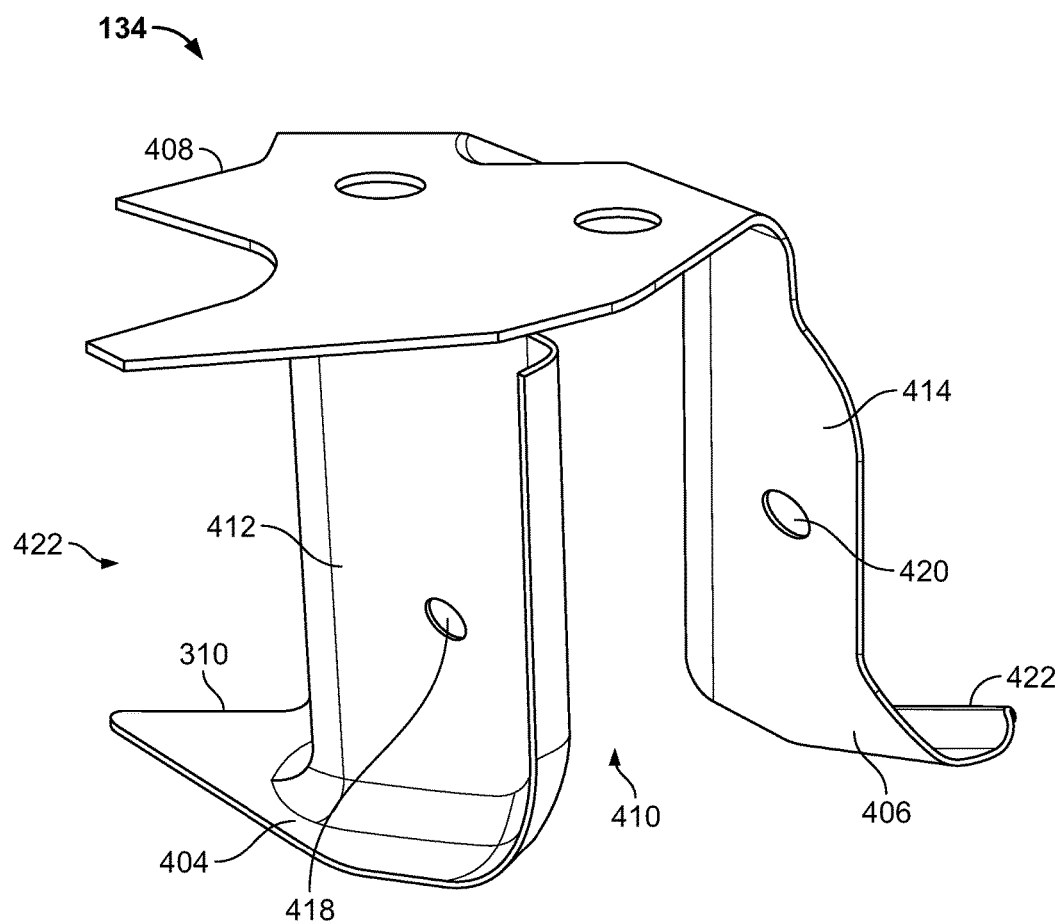
FIG. 4 is an enlarged perspective view of an example first bracket of the example modular platform of FIGS. 2 and 3.
Figure 6:
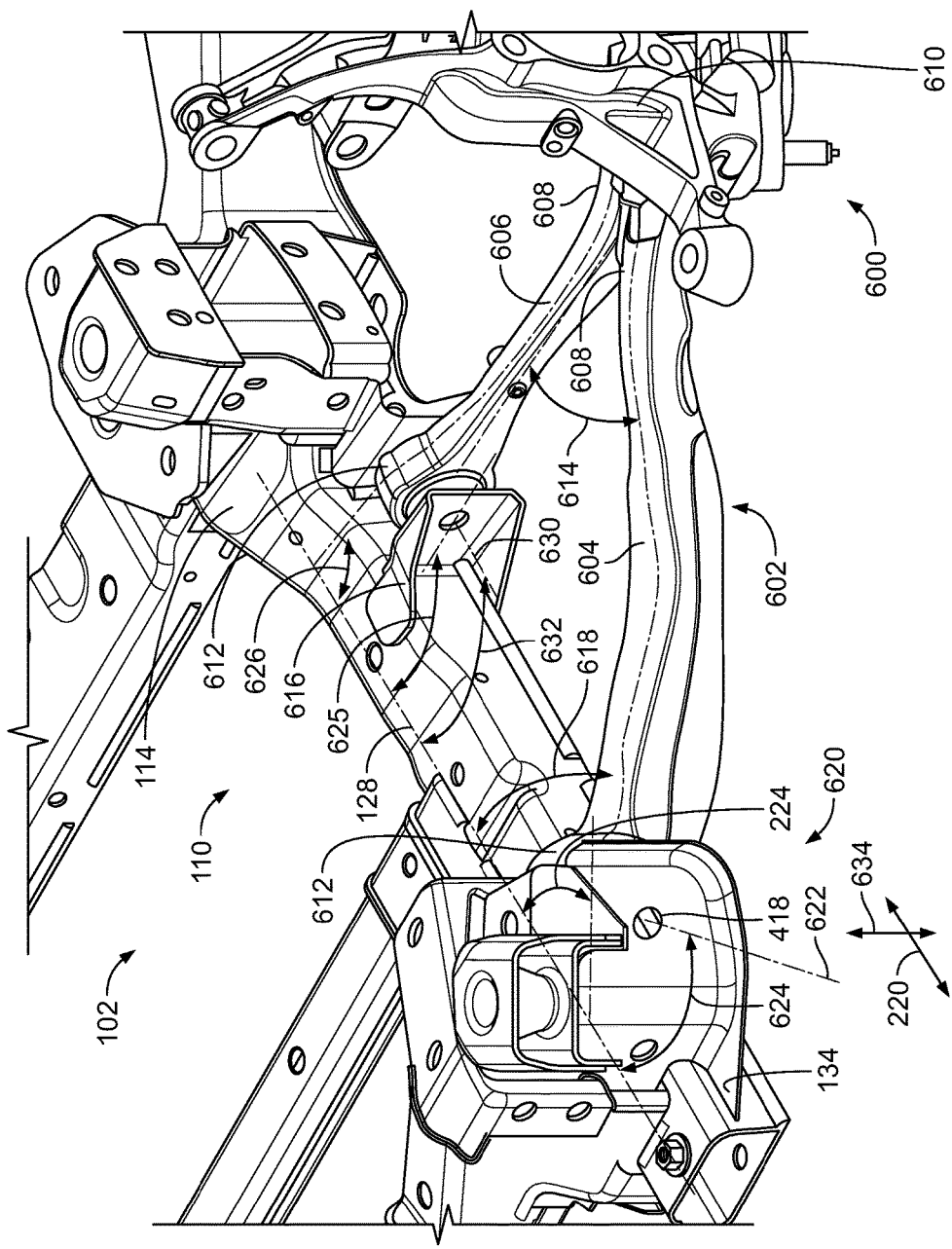
FIG. 6 is a perspective view of a portion of the example modular platform of FIG. 2 constructed in accordance with the teachings of this disclosure to support a second suspension.

FIG. 4 is a perspective view of the first bracket 134 of FIGS. 2 and 3. Referring to FIG. 4, the first bracket 134 of the illustrated example is a common bracket that can support the first suspension 200 and a second suspension 600 (FIG. 6). The first bracket 134 of the illustrated example defines a body 402 having a first leg 404 and a second leg 406 protruding from a plate 408 (e.g., an upper plate). The first leg 404 of the illustrated example is spaced apart from the second leg 406 to define an opening 410 to receive the second end 212 of the first control arm 204 of the first suspension 200. The first leg 404 of the illustrated example defines a first body surface 412 (e.g., a vertical surface) and the second leg 406 of the illustrated example defines a second body surface 414. The first body surface 412 of the illustrated example is parallel relative to the second body surface 414. The first leg 404 of the illustrated example includes a first opening 418 and the second leg 406 of the illustrated example includes a second opening 420. The first opening 418 of the first leg 404 of the illustrated example is coaxially aligned with the second opening 420 of the second leg 406. The first opening 418 and the second opening 420 receive a fastener (e.g., a bolt) to couple (e.g., pivotally couple) the second end 212 of the first control arm 204 to the first bracket 134. In some examples, the location of the first opening 418 and the second opening 420 may be formed at a different location (e.g., at a higher or lower location in the orientation of FIG. 3) to support the first suspension 200 or the second suspension 600. The first leg 404 defines the first attachment surface or edge 310 and the second leg 406 of the illustrated example defines a second attachment surface or edge 422 that couple or attach (e.g., are welded) to the longitudinal rail 114 (e.g., to the outer side surface 306 of the longitudinal rail 114). In other examples, the first bracket 134 may have any other shape or profile (e.g., geometry, dimensions, etc.) that can support the second end 212 of the first control arm 204.

Figure 5:
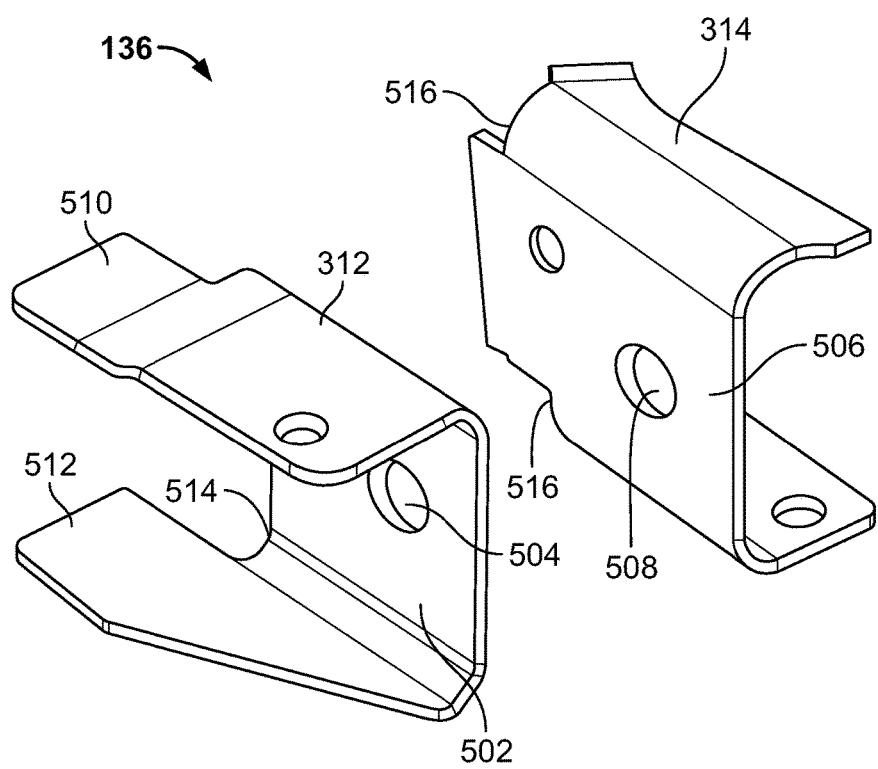
FIG. 5 is an enlarged perspective view of an example second bracket of the example modular platform of FIGS. 2 and 3.

FIG. 5 is a perspective view of the second bracket 136 of FIGS. 2 and 3. As noted above, the second bracket 136 of the illustrated example includes the first body 312 and the second body 314. In the illustrated example, the first body 312 is a separate structure from the second body 314. However, in some examples, the first body 312 and the second body 314 may be a unitary structure. The first body 312 of the illustrated example includes a main body 502 (e.g., a vertical surface) including a first opening 504. The second body 314 of the illustrated example also includes a main body 506 (e.g., a vertical surface) including a second opening 508. The first body 312 of the illustrated example is spaced from the second body 314 when coupled to the longitudinal rail 114 to receive the second end 212 of the second control arm 206. The first opening 504 and the second opening 508 are positioned in coaxial alignment when coupled to the longitudinal rail 114 and a receive a fastener to couple the second bracket 136 to the second end 212 of the second control arm 206. The first body 312 of the illustrated example includes an upper flange 510 and a lower flange 512 extending from the main body 502. As noted above, the upper flange 510 attaches to the upper surface 302 of the longitudinal rail 114 and the lower flange 512 attaches to the lower surface 304 of the longitudinal rail 114. In the illustrated example, the main body 502 includes an edge 514 that attaches to the outer side surface 306 of the longitudinal rail 114. Referring to the second body 314 of the illustrated example, the second body 314 includes an edge 516 that attaches to the outer side surface 306 of the longitudinal rail 114. In other examples, the second bracket 136 may have any other shape or profile (e.g., geometry, dimensions, etc.) that can support the second end 212 of the second control arm 206.

FIG. 6 illustrates a perspective, enlarged partial view of the modular platform 102 of the vehicle 100 configured to receive the second suspension 600 (e.g., a MacPherson Strut). The second suspension 600 of the illustrated example includes lower suspension links 602 that couples to the frame 110. The lower suspension links 602 includes a first control arm 604 and a second control arm 606. Each of the first control arm 604 and the second control arm 606 has a first end 608 that couples to a knuckle 610 and a second end 612 that couples to the frame 110. To provide target handling characteristic(s) of the second suspension 600, the first control arm 604 of the illustrated example is positioned at an angle 614 (e.g., an angle between approximately 20 degrees and 80 degrees) relative to the second control arm 606. The angle 614 of the third bracket 616 of the illustrated example is different than the angle 238 of the second bracket 136 shown in FIG. 2. In addition, geometries and dimensions (e.g., a length along a longitudinal axis) of the first control arm 604 and/or the second control arm 606 of the second suspension 600 may be different than a geometries and dimensions (e.g., a length along a longitudinal axis) of the first control arm 204 and/or the second control arm 206 of the first suspension 200 of FIG. 2, requiring different attachment points to the frame 110.

To configure the modular platform 102 of the illustrated example to receive the second suspension 600, the frame 110 of the illustrated example includes the first bracket 134 and a third bracket 616. The first control arm 604 of the second suspension 600 of the illustrated example is coupled to the first bracket 134 and the second control arm 606 is coupled to the third bracket 616. For example, the first control arm 604 is coupled (e.g., fastened) to the first bracket 134 via a fastener (e.g., a bolt) and the second control arm 606 is coupled (e.g., fastened) to the third bracket 616 via a second fastener (e.g., a bolt). The second ends 612 of the respective first control arm 604 and the second control arm 606 of the illustrated example include respective bushings to enable the first control arm 604 and the second control arm 606 to pivot relative to the frame 110 and/or the respective first bracket 134 and the third bracket 616. Thus, the first control arm 604 is pivotally coupled to the frame 110 via the first bracket 134 and the second control arm 606 of the illustrated example is pivotally coupled to the frame 110 via the third bracket 616.

The first bracket 134 and the third bracket 616 are positioned on the frame 110 to enable the second suspension 600 to achieve target handling characteristic(s). For example, the first bracket 134 of the illustrated example is spaced relative to the third bracket 616. For example, the first bracket 134 is spaced from the third bracket 616 in the aft-fore direction 220 along the longitudinal rail 114 based on the angle 614 between the first control arm 604 and the second control arm 606. Thus, a distance between the second ends 612 of the respective first control arm 604 and the second control arm 606 of the second suspension 600 (e.g., in a direction along the longitudinal axis 128 of the longitudinal rail 114) determines the positions of the first bracket 134 and the third bracket 616 on the longitudinal rail 114.

Additionally, the first bracket 134 and the third bracket 616 of the illustrated example are angled relative to the longitudinal rail 114 based on the orientation (e.g., angles) of the respective first control arm 604 and the second control arm 606 relative to the longitudinal rail 114. The first bracket 134 is positioned at the angle 224 relative to the longitudinal rail 114. In addition, the angle 224 of the first bracket 134 of the illustrated example is substantially similar (e.g., within 2 degrees or identical) to an angle 618 of the first control arm 604 relative to the longitudinal rail 114. Additionally, the first bracket 134 receives the second end 612 of the first control arm 604 to define a connection point 620 between the first bracket 134 and the second end 612 of the first control arm 604. The connection point 620 of the illustrated example provides a pivot axis 622 positioned at an angle 624 (e.g., between approximately 30 degrees and 80 degrees) relative to the longitudinal axis 128 of the longitudinal rail 114. In the illustrated example, the angle 624 of pivot axis 622 is the same as the angle 230 of the first pivot axis 216 of FIG. 2.

To enable an angular relationship between the third bracket 616 and the second control arm 606, the third bracket 616 of the illustrated example is positioned or coupled to the frame 110 such that the third bracket 616 protrudes from the longitudinal rail 114 at an angle 625 relative to the longitudinal axis 128 of the longitudinal rail 114. For example, the angle 625 of the third bracket 616 of the illustrated example is substantially similar (e.g., within 2 degrees or identical) to an angle 626 (e.g., of a longitudinal axis) of the second control arm 606 relative to the longitudinal rail 114. Additionally, the third bracket 616 receives the second end 612 of the second control arm 606 to define a connection point 628 between the third bracket 616 and the second control arm 606. The connection point 628 of the illustrated example provides a pivot axis 630 that is at an angle 632 (e.g., 30 degrees and 80 degrees) relative to the longitudinal axis 128 of the longitudinal rail 114. In the illustrated example, the angle 632 of the pivot axis 630 is different than the angle 238 of the second pivot axis 218 of FIG. 2.

Although the second suspension 600 of the illustrated example is different than the first suspension 200 of FIG. 2, the first bracket 134 of the illustrated example is configured to receive the first control arm 204 of the first suspension 200 as shown in FIG. 2 or the first control arm 604 of the second suspension 600 as shown in FIG. 6. Thus, the first bracket 134 is a common bracket that can accommodate either the first suspension 200 or the second suspension 600. In some examples, to accommodate a height of the first control arm 604 of the second suspension 600 (e.g., in an up-down direction 634 of the illustrated example), the first opening 418 (and the second opening 420) of the first bracket 134 may be formed at a different location (e.g., in the up-down direction 634) than the location shown in FIG. 2. For example, the first opening 418 of the first leg 404 or the second opening 420 of the second leg 406 (FIG. 4) may be repositioned or formed at different locations (e.g., in the up-down direction 634). Thus, in some such examples, although the geometry or dimensions (e.g., a perimeter shape, a cross-section, etc.) of the first bracket 134 does not change when the first bracket 134 is used to support the first suspension 200 or the second suspension 600, the location of the first opening 418 and the second opening 420 may differ.

Figure 7:
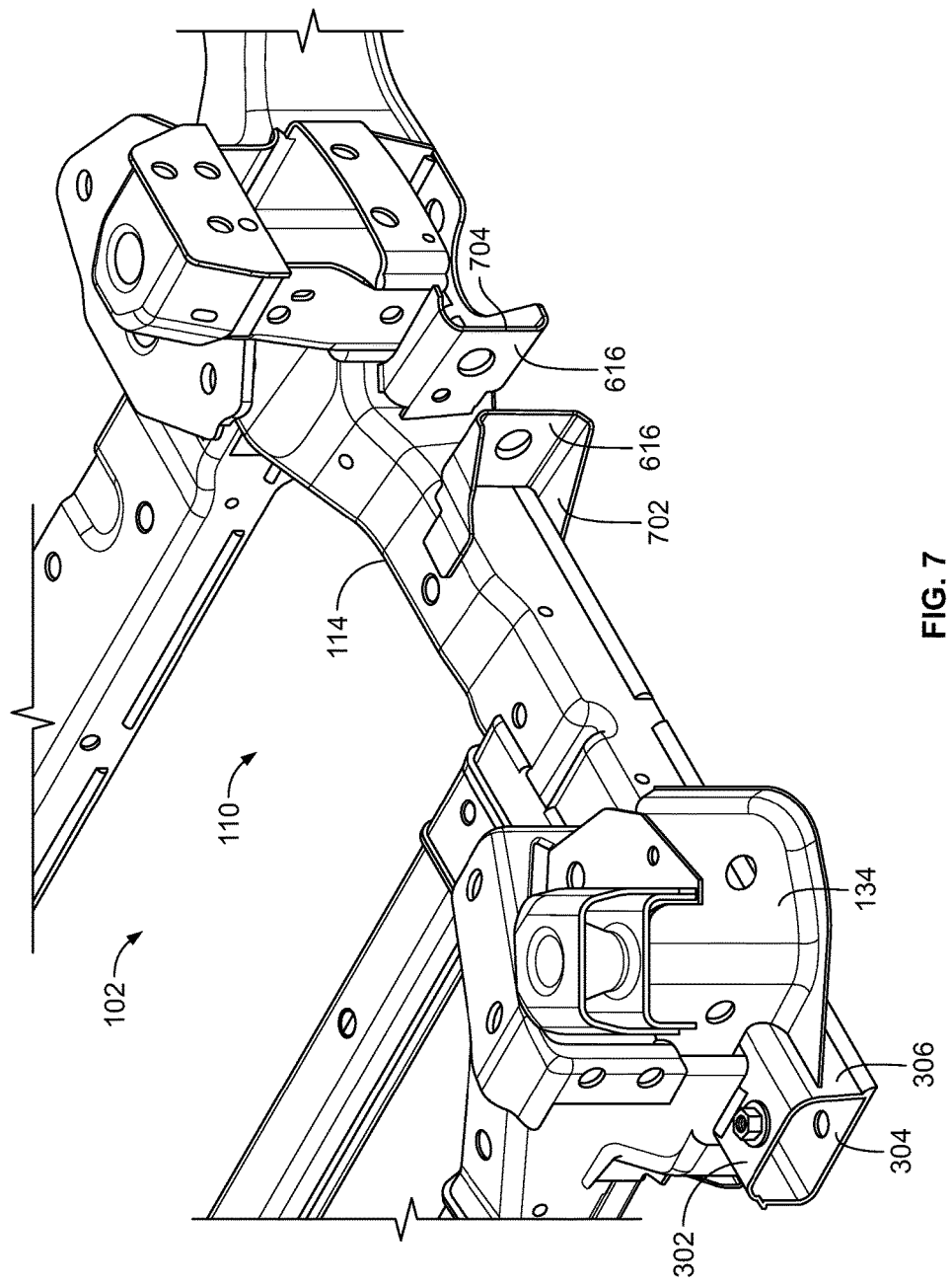
FIG. 7 is a perspective view of the example modular platform of FIG. 6 without the second suspension.

FIG. 7 illustrates the modular platform 102 of FIG. 6 shown without the second suspension 600. Referring to FIG. 7, the first bracket 134 and the third bracket 616 of the illustrated example are welded to the longitudinal rail 114 of the modular platform 102. The third bracket 616 of the illustrated example includes a first body 702 and a second body 704. The first body 702 of the third bracket 616 is welded to at least one of the upper surface 302, the lower surface 304 or the outer side surface 306 of the longitudinal rail 114. In the illustrated example, the first body 702 of the third bracket 616 is welded to upper surface 302, the lower surface 304 and the outer side surface 306 of the longitudinal rail 114. The second body 704 is welded to the outer side surface 306 of the longitudinal rail 114. The third bracket 616 protrudes in a direction away from the outer side surface 306 of the longitudinal rail 114 when the third bracket 616 is coupled to the frame 110.

Figure 8:
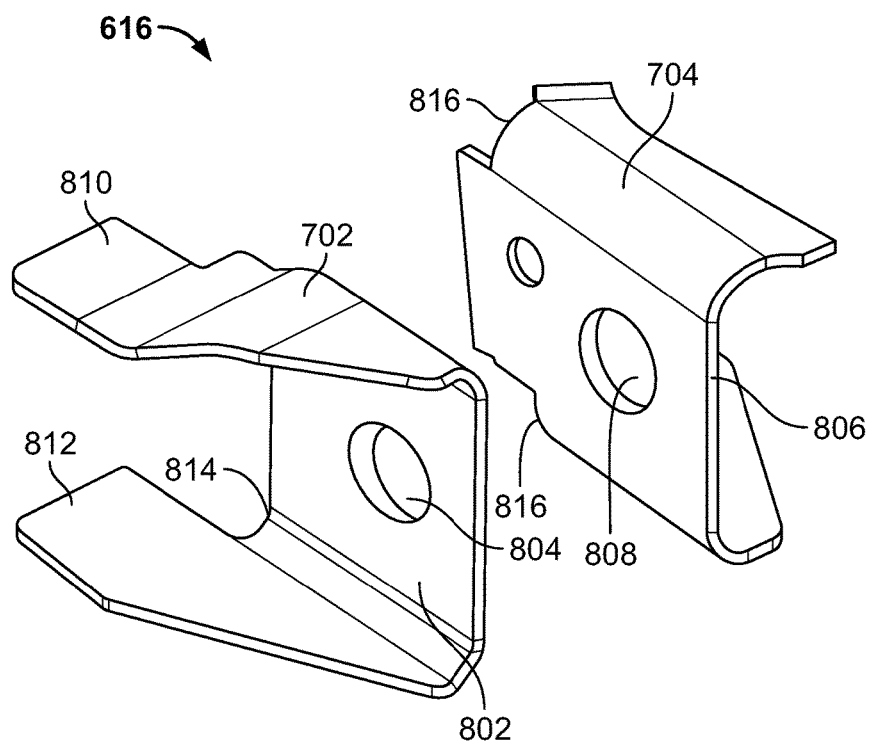
FIG. 8 is an enlarged perspective view of an example third bracket of the example modular platform of FIGS. 6 and 7.

FIG. 8 is a perspective view of the third bracket 616 of FIGS. 6 and 7. Referring to FIG. 8, the third bracket 616 includes the first body 702 and the second body 704. In the illustrated example, the first body 702 and the second body 704 are separate structures. However, in some examples, the first body 702 and the second body 704 may be a unitary structure. The first body 702 of the illustrated example includes a main body 802 (e.g., a vertical surface) including a first opening 804. The second body 704 of the illustrated example includes a main body 806 (e.g., a vertical surface) including a second opening 808. The first body 702 of the illustrated example is spaced from the second body 704 when coupled to the longitudinal rail 114 to receive the second end 612 of the second control arm 606. The first opening 804 of the first body 702 and the second opening 808 of the second body 704 are positioned in coaxial alignment when coupled to the longitudinal rail 114. The first body 702 of the illustrated example includes an upper flange 810 and a lower flange 812 extending from the main body 802. The upper flange 810 attaches to the upper surface 302 of the longitudinal rail 114 and the lower flange 812 attaches to the lower surface 304 of the longitudinal rail 114. In the illustrated example, the main body 802 includes an edge 816 that attaches to the outer side surface 306 of the longitudinal rail 114. Referring to the second body 704 of the illustrated example, the second body 704 includes an edge 816 (e.g., a rear edge a perimeter of the second body 704) that attaches to the outer side surface 306 of the longitudinal rail 114. In other examples, the third bracket 616 may have any other shape or profile (e.g., geometry, dimensions, etc.) that can support the second end 612 of the second control arm 606.

The first bracket 134, the second bracket 136 and/or the third bracket 616 may be formed via stamping, CNC laser cutting, milling, drilling and/or any other suitable manufacturing processes. The frame 110, the first bracket 134, the second bracket 136 and/or the third bracket 616 may be composed of ferrous material(s) (e.g., steel), non-ferrous material(s) (e.g., aluminum), alloys and/or any other suitable material(s).

The modular platform 102 of the examples shown in FIGS. 2-8 is not limited to the first bracket 134 (e.g., a common ride link attachment bracket), the second bracket 136 and the third brackets 616 (e.g., unique lateral link attachment brackets). In some examples, the second bracket 136 may be configured to support the first suspension 200 and the second suspension 600. In some such examples the first bracket 134 may be configured to support the first suspension 200 and a different first bracket may be employed to support the second suspension 600.

Figure 9:
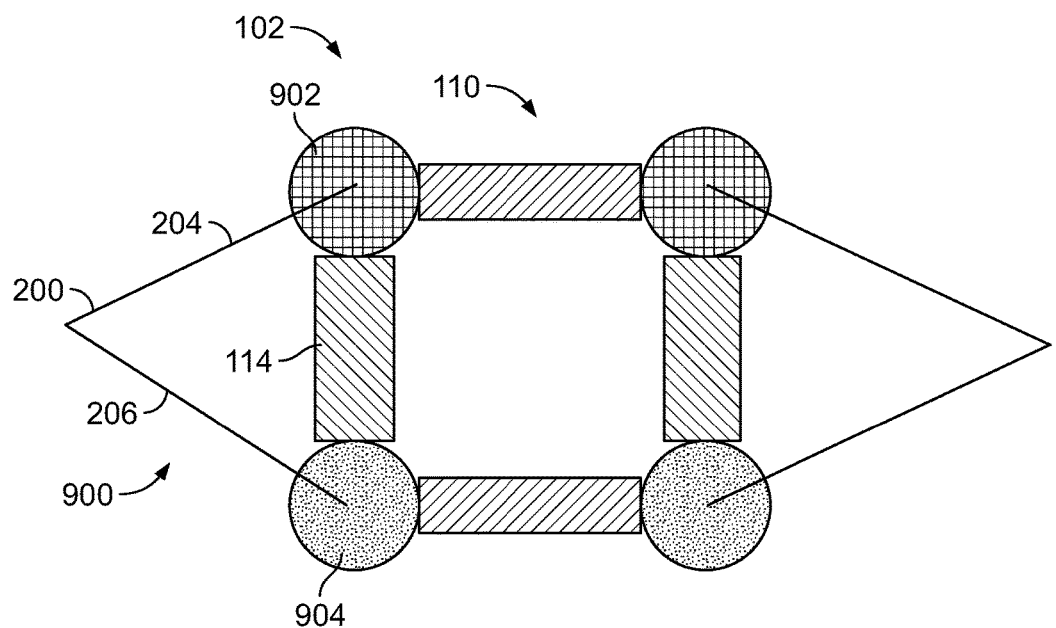
FIGS. 9-14 are schematic illustrations of the example modular platform of FIGS. 2-8 implemented with different example brackets to support the first suspension or the second suspension.
Figure 10:
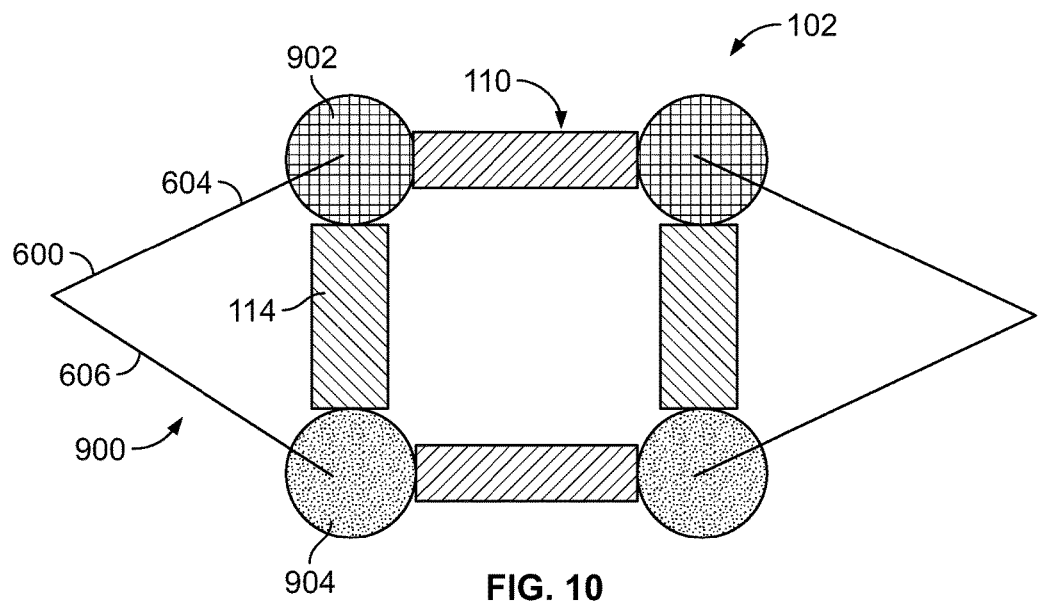

Examples of different example bracket configurations that may be employed are described in FIGS. 9-14. For example, FIGS. 9 and 10 illustrate the modular platform 102 of FIGS. 2-8 configured with a first set of brackets 900 that can support the first suspension 200 as shown in FIG. 9 or the second suspension 600 as shown in FIG. 10. For example, the first set of brackets 900 of the illustrated example includes a ride link attachment bracket 902 (e.g., a first bracket) and a lateral link attachment bracket 904 (e.g., a second bracket) that, for example, may be welded to the longitudinal rail 114 of the frame 110. Referring to FIG. 9, the ride link attachment bracket 902 of the illustrated example couples the first control arm 204 of the first suspension 200 to the longitudinal rail 114 and the lateral link attachment bracket 904 of the illustrated example couples the second control arm 206 of the first suspension 200 to the frame 110. Referring to FIG. 10, the ride link attachment bracket 902 of the illustrated example couples the first control arm 604 of the second suspension 600 to the longitudinal rail 114 and the lateral link attachment bracket 904 couples the second control arm 606 of the second suspension 600 to the longitudinal rail 114. Therefore, unlike the brackets of FIGS. 2-8, the ride link attachment bracket 902 and the lateral link attachment bracket 904 of the illustrated example can support both the first suspension 200 and the second suspension 600.

Figure 11:
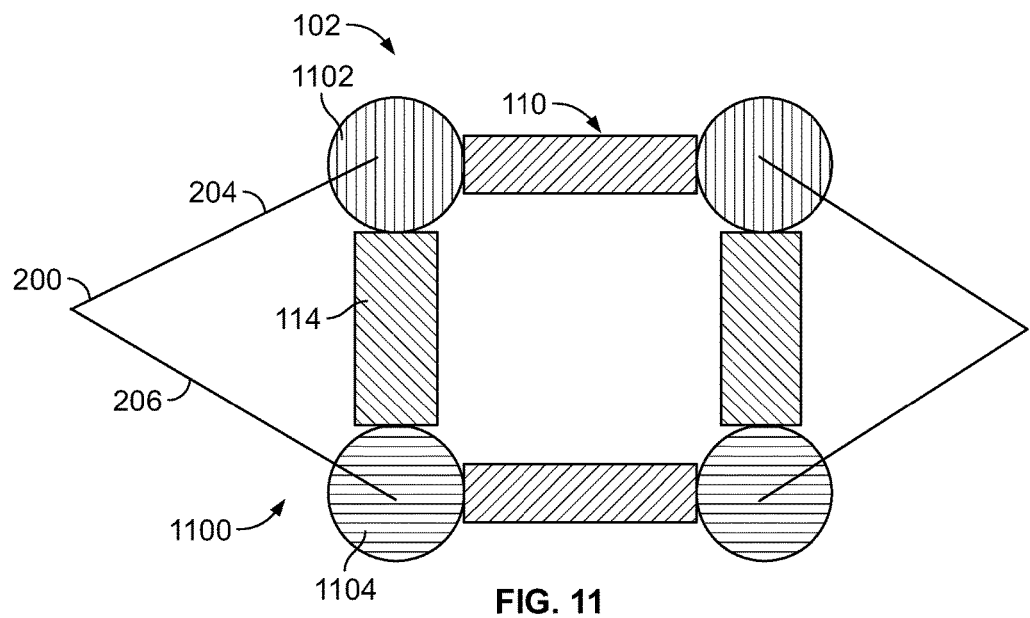
Figure 12:
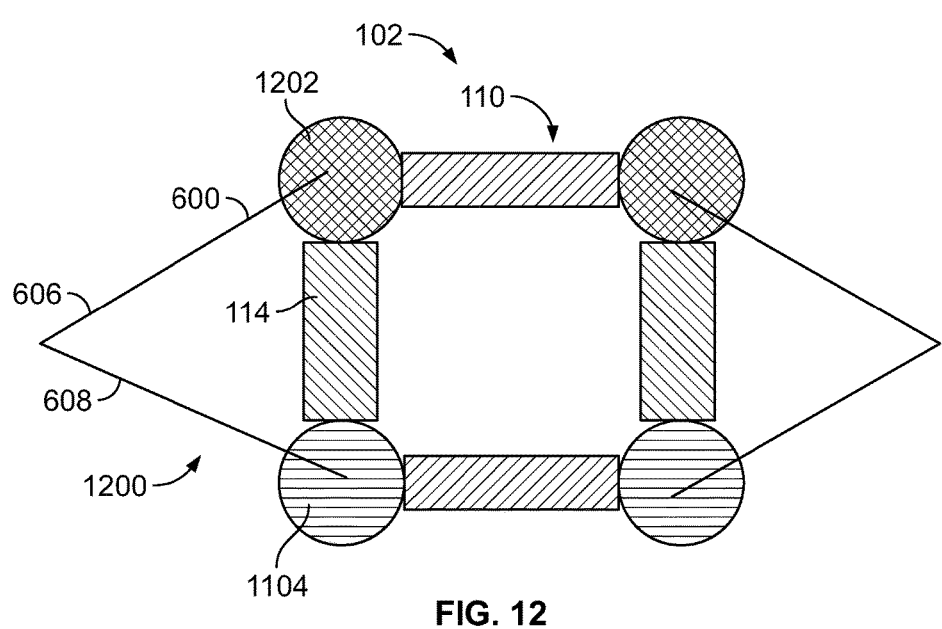

FIGS. 11 and 12 illustrates the modular platform 102 of FIGS. 2-8 configured with a first set of brackets 1100 that can support the first suspension 200 as shown in FIG. 11, and a second set of brackets 1200 that can support the second suspension 600 as shown in FIG. 12. The first set of brackets 1100 of the illustrated example includes a ride link attachment bracket 1102 and a lateral link attachment bracket 1104. The ride link attachment bracket 1102 of the illustrated example couples the first control arm 204 of the first suspension 200 to the modular platform 102 and in the lateral link attachment bracket 1104 couples the second control arm 206 of the first suspension 200 to the modular platform 102. Referring to FIG. 12, the second set of brackets 1200 of the illustrated example includes a ride link attachment bracket 1202 and the lateral link attachment bracket 1104. The ride link attachment bracket 1202 of the illustrated example couples the first control arm 604 of the second suspension 600 to the modular platform 102 and the lateral link attachment bracket 1104 couples the second control arm 606 of the second suspension 600 to the modular platform 102. Thus, the modular platform 102 of FIGS. 11 and 12 includes ride link attachment bracket 1102 and the ride link attachment bracket 1202 (e.g., first brackets or unique brackets) to couple the respective first suspension 200 and the second suspension 600 to the frame 110, and includes a lateral link attachment bracket 1104 (e.g., a common bracket or a second bracket) that can support or attach both the first suspension 200 and the second suspension 600 to the frame 110.

Figure 13:
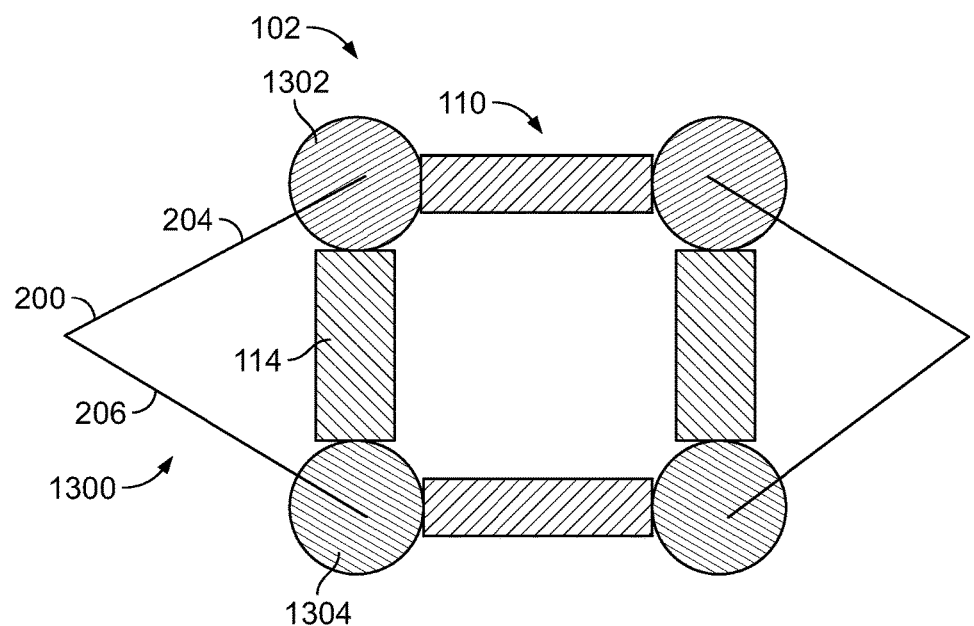
Figure 14:
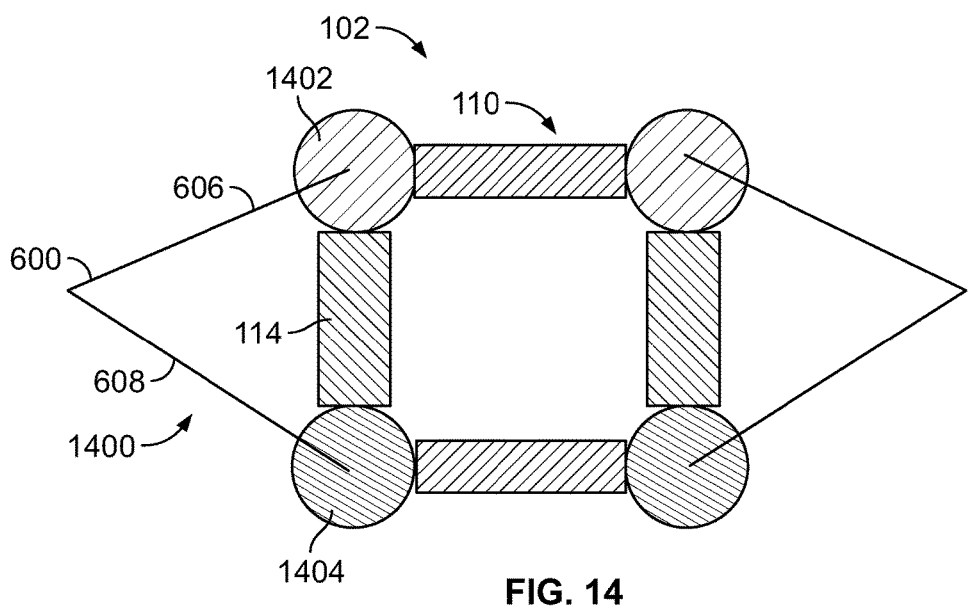

FIGS. 13 and 14 illustrates the modular platform 102 of FIGS. 2-8 configured with a first set of brackets 1300 that can support the first suspension 200 as shown in FIG. 13, and a second set of brackets 1400 that can support the second suspension 600 as shown in FIG. 14. Referring to FIG. 13, the first set of brackets 1300 of the illustrated example a first ride link attachment bracket 1302 and a first lateral link attachment bracket 1304. The first ride link attachment bracket 1302 of the illustrated example couples the first control arm 204 of the first suspension 200 to the longitudinal rail 114 and the first lateral link attachment bracket 1304 of the illustrated example couples the second control arm 206 of the first suspension 200 to the longitudinal rail 114. Referring to FIG. 14, the second set of brackets 1400 of the illustrated example includes a second ride link attachment bracket 1402 and a second lateral link attachment bracket 1404. The second ride link attachment bracket 1402 of the illustrated example couples the first control arm 604 of the second suspension 600 to the longitudinal rail 114 and the second lateral link attachment bracket 1404 of the illustrated example couples the second control arm 606 of the second suspension 600 to the longitudinal rail 114. Therefore, in the examples of FIG. 13-14, the first set of brackets 1300 is provided to support the first suspension 200 and the second set of brackets 1400 is provided to support the second suspension 600 such that there are no common or similar brackets between the first set of brackets 1300 and the second set of brackets 1400.

Figure 15:
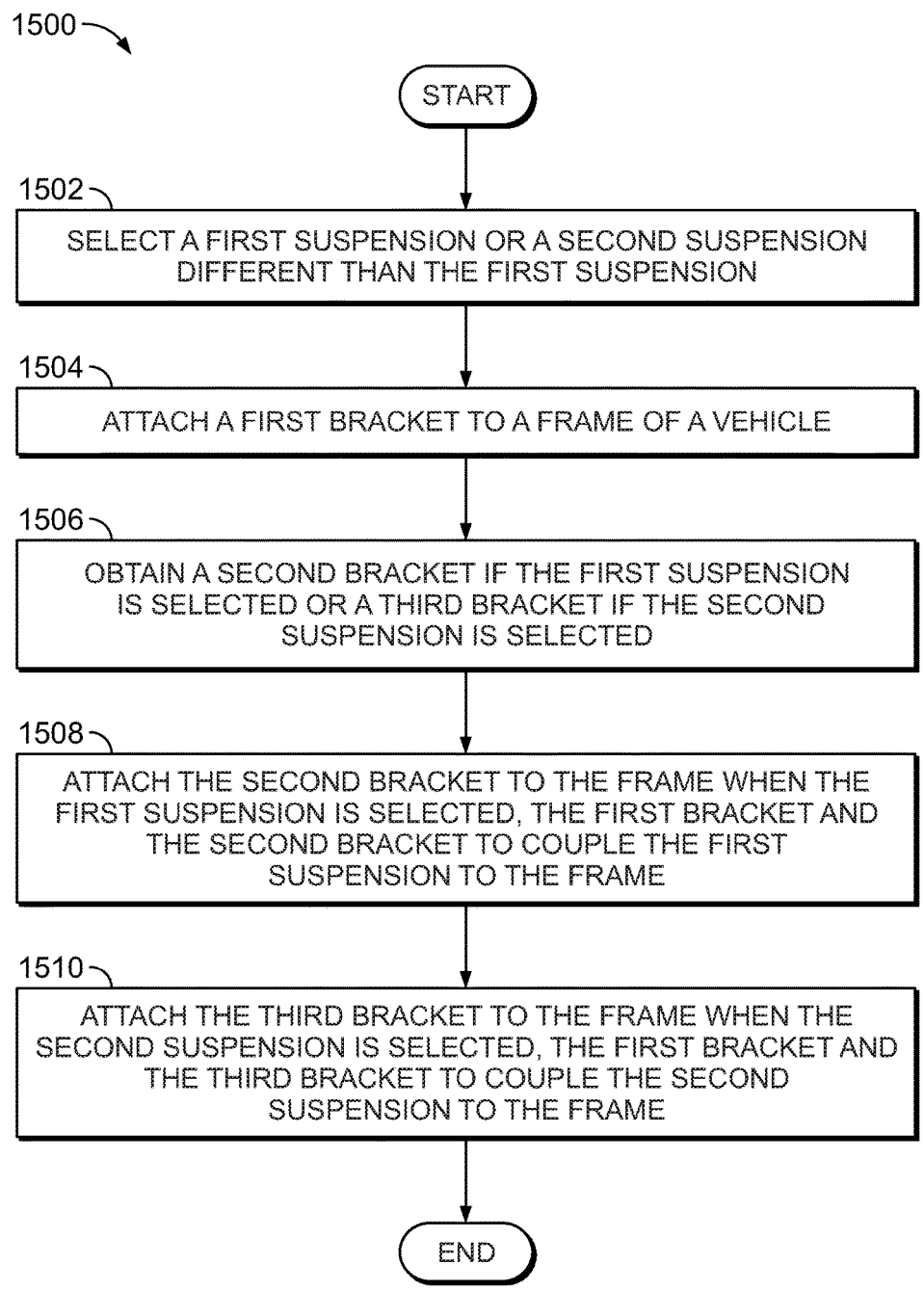
FIG. 15 is a flowchart of example method of assembling the example modular platform of FIGS. 2-14.

FIG. 15 is a flowchart illustrating an example method of assembling the modular platform 102 of FIGS. 1A, 1B and 2-14. While the example method will be explained with reference to FIG. 15, many other methods of assembling the modular platform 102 of FIGS. 2-14 described above may alternatively be used. For example, the order of execution of the blocks may be changed, and/or some of the blocks described may be changed, eliminated, and/or combined.

The method of FIG. 15 begins by selecting between a first suspension 200 or a second suspension 600 different than the first suspension 200 (block 1502). A first bracket 134 is attached to the frame 110 of the vehicle 100 (block 1504). A second bracket 136 is obtained if the first suspension 200 is selected or a third bracket 616 is obtained if the second suspension 600 is selected (block 1506). The second bracket 136 is attached to the frame 110 when the first suspension 200 is selected (block 1508). For example, the first bracket 134 and the second bracket 136 couple the first suspension 200 to the frame 110. A third bracket 616 is attached to the frame 110 when the second suspension 600 is selected (block 1510). For example, the first bracket 134 and the third bracket 616 couple the second suspension 600 to the frame 110. In some examples, instead of the first bracket 134, one of the ride link attachment bracket 902, 1102, or 1302 and one of the lateral link attachment brackets 904, 1104, or 1304 are attached to the frame 110 of the vehicle 100 when the first suspension 200 is selected. In some such examples, instead of the second bracket 136 or the third bracket 616, one of the ride link attachment bracket 902, 1302, or 1402 and one of the lateral link attachment brackets 904, 1204, or 1404 are attached to the frame 110 of the vehicle 100 when the second suspension 600 is selected.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus, comprising:
a frame including a first longitudinal rail to couple to a body of a vehicle;
a first bracket coupled to the first longitudinal rail of the frame; and
one of a second bracket or a third bracket to couple to the first longitudinal rail of the frame, the first bracket having a first geometry different than a second geometry of the second bracket and a third geometry of the third bracket, the second geometry of the second bracket being different than the third geometry of the third bracket, the first longitudinal rail configured to receive a first suspension when the first bracket and the second bracket are coupled to the first longitudinal rail of the frame, and the first longitudinal rail configured to receive a second suspension when the first bracket and the third bracket are coupled to the first longitudinal rail of the frame, the first suspension having a first geometry that is different than a second geometry of the second suspension.

2. The apparatus of claim 1, wherein the frame includes a second longitudinal rail spaced from the first longitudinal rail and a lateral rail connecting the first longitudinal rail and the second longitudinal rail.

3. The apparatus of claim 1, wherein the first bracket is spaced from the second bracket or the third bracket.

4. The apparatus of claim 1, wherein the second bracket is to project from the first longitudinal rail at a first angle relative to a longitudinal axis of the first longitudinal rail when the second bracket is coupled to the first longitudinal rail.

5. The apparatus of claim 4, wherein the third bracket is to project from the first longitudinal rail at a second angle relative to a longitudinal axis of the first longitudinal rail when the third bracket is coupled to the first longitudinal rail.

6. The apparatus of claim 1, wherein the first bracket is to receive a first control arm of the first suspension or a first control arm of the second suspension.

7. The apparatus of claim 6, wherein the first bracket includes a first leg and a second leg projecting from a plate of the first bracket, the first leg being spaced from the second leg to define an opening to receive an end of the first control arm of the first suspension or an end of the first control arm of the second suspension.

8. The apparatus of claim 6, wherein the second bracket is to receive a second control arm of the first suspension.

9. The apparatus of claim 8, wherein the second bracket includes a first body and a second body, the first body being spaced from the second body to form an opening to receive an end of the second control arm of the first suspension.

10. The apparatus of claim 6, wherein the third bracket is to receive a second control arm of the second suspension.

11. The apparatus of claim 9, wherein the third bracket includes a first body and a second body, the first body being spaced from the second body to form an opening to receive an end of the second control arm of the second suspension.

12. The apparatus of claim 1, wherein the first suspension includes a MacPherson strut and the second suspension includes a Short-Long Arm suspension.

13. The apparatus of claim 1, wherein the first, second, and third brackets each have different mounting features.

14. A method comprising:
attaching a first bracket to a first longitudinal rail of a frame;
selecting a first suspension or a second suspension different than the first suspension to be received by the first longitudinal rail of the frame;
obtaining a second bracket if the first suspension is selected or a third bracket if the second suspension is selected, the first bracket having a first geometry different than a second geometry of the second bracket and a third geometry of the third bracket, the second geometry of the second bracket being different than the third geometry of the third bracket; and
attaching the second bracket to the first longitudinal rail of the frame when the first suspension is selected or attaching the third bracket to the first longitudinal rail of the frame when the second suspension is selected, the first bracket and the second bracket to couple the first suspension to the first longitudinal rail of the frame, and the first bracket and the third bracket to couple the second suspension to the first longitudinal rail of the frame.

15. The method of claim 14, further including coupling a first control arm of the first suspension or a first control arm of the second suspension to the first bracket.

16. The method of claim 15, further including coupling a second control arm of the first suspension to the second bracket.

17. The method of claim 15, further including coupling a second control arm of the second suspension to the third bracket.

18. An apparatus comprising:
a frame including a lateral frame connecting a first longitudinal rail and a second longitudinal rail spaced from the first longitudinal rail; and
a first set of brackets including a first bracket and a second bracket to couple to the first longitudinal rail, the first set of brackets to couple lower suspension links of a first suspension to the frame; or
a second set of brackets including the first bracket and a third bracket, the first bracket having a first geometry different than a second geometry of the second bracket and a third geometry of the third bracket, the second geometry of the second bracket being different than the third geometry of the third bracket, to couple to the first longitudinal rail, the second set of brackets to couple lower suspension links of a second suspension to the frame, the first suspension having dimensions that are different than dimensions of the second suspension.

19. The apparatus of claim 18, wherein each of the first set of brackets and the second set of brackets includes a ride link attachment bracket to support a first control arm of the lower suspension links of the first suspension or a first control arm of the lower suspension links of the second suspension, and a lateral link attachment bracket to support a second control arm of the lower suspension links of the first suspension or a second control arm of the lower suspension links of the second suspension.

20. The apparatus of claim 18, wherein the first set of brackets includes a first ride link attachment bracket and a lateral attachment bracket, the first ride link attachment bracket to support a first control arm of the lower suspension links of the first suspension and the lateral attachment bracket to support a second control arm of the lower suspension links of the first suspension.

21. The apparatus of claim 20, wherein the second set of brackets includes a second ride link attachment bracket and the lateral attachment bracket, the second ride link attachment bracket to support a first control arm of the lower suspension links of the second suspension and the lateral attachment bracket to support a second control arm of the lower suspension links of the second suspension.

22. The apparatus of claim 18, wherein the first set of brackets includes a ride link attachment bracket and a first lateral attachment bracket, the ride link attachment bracket to support a first control arm of the lower suspension links of the first suspension and the first lateral attachment bracket to support a second control arm of the lower suspension links of the first suspension, or wherein the second set of brackets includes the ride link attachment bracket and a second lateral attachment bracket, the second lateral attachment bracket being different than the first lateral attachment bracket, the ride link attachment bracket to support a first control arm of the lower suspension links of the second suspension and the second lateral attachment bracket to support a second control arm of the lower suspension links of the second suspension.

23. The apparatus of claim 18, wherein the first set of brackets includes a first ride link attachment bracket to support a first control arm of the lower suspension links of the first suspension and a first lateral attachment link to support a second control arm of the lower suspension links of the first suspension, or the second set of brackets includes a second ride link attachment bracket to support a first control arm of the lower suspension links of the second suspension and a second lateral link attachment bracket to support a second control arm of the lower suspension links of the second suspension.

\* \* \* \* \*